United States Patent
Wittke et al.

(10) Patent No.: US 11,933,960 B2
(45) Date of Patent: Mar. 19, 2024

(54) MICROSCOPE SYSTEM WITH AN INPUT UNIT FOR SIMULTANEOUSLY ADJUSTING AT LEAST THREE ADJUSTMENT PARAMETERS BY MEANS OF AN INPUT POINTER THAT IS POSITIONABLE IN AN INPUT AREA

(71) Applicant: Leica Microsystems CMS GmbH, Wetzlar (DE)

(72) Inventors: Werner Wittke, Braunfels (DE); Patric Pelzer, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 297 days.

(21) Appl. No.: 17/413,579

(22) PCT Filed: Dec. 12, 2019

(86) PCT No.: PCT/EP2019/084982
§ 371 (c)(1),
(2) Date: Jun. 14, 2021

(87) PCT Pub. No.: WO2020/120710
PCT Pub. Date: Jun. 18, 2020

(65) Prior Publication Data
US 2022/0057618 A1  Feb. 24, 2022

(30) Foreign Application Priority Data
Dec. 14, 2018 (DE) .................... 10 2018 132 337.9

(51) Int. Cl.
*G02B 21/36* (2006.01)
*G02B 21/06* (2006.01)

(52) U.S. Cl.
CPC .......... *G02B 21/365* (2013.01); *G02B 21/06* (2013.01); *G02B 21/368* (2013.01)

(58) Field of Classification Search
CPC .... G02B 21/365; G02B 21/06; G02B 21/368; G02B 21/24
(Continued)

(56) References Cited

U.S. PATENT DOCUMENTS

| 5,867,284 A | 2/1999 | Wolf |
| 2005/0037406 A1 | 2/2005 | De La Torre-Bueno et al. |

(Continued)

FOREIGN PATENT DOCUMENTS

| DE | 19853407 A1 | 5/2000 |
| DE | 102010063392 A1 | 5/2012 |

(Continued)

OTHER PUBLICATIONS

Abramowitz, Mortimer et al. "The Physics of Light and Color—Light Filtration," Olympus Life Science, May 22, 2014, XP055678104, pp. 1-7, Online.

*Primary Examiner* — Balram T Parbadia
*Assistant Examiner* — Rahman Abdur
(74) *Attorney, Agent, or Firm* — Leydig, Voit & Mayer, Ltd.

(57) ABSTRACT

A microscope system includes: at least one microscope component with electrically adjustable component parameters; a controller for generating electrical signals and transmitting the electrical signals to the at least one microscope component to set the electrically adjustable component parameters; and a computer having at least one display unit, the computer generating an input unit having a graphical user interface on the at least one display unit, at least three setting parameters being adjustable by the graphical user interface. The input unit has an input pointer that is positionable in an input area so as to set a respective value for the at least three setting parameters. A coordinate axis is defined in the input area for each of the at least three setting (Continued)

parameters, with at least one coordinate axis not being perpendicular to another coordinate axis. Values of the at least three setting parameters are determined by the coordinates.

20 Claims, 3 Drawing Sheets

(58) Field of Classification Search
USPC .......................................................... 359/385
See application file for complete search history.

(56) References Cited

U.S. PATENT DOCUMENTS

| | | |
|---|---|---|
| 2006/0011812 A1 | 1/2006 | Wolleschensky et al. |
| 2012/0120224 A1 | 5/2012 | Zuest et al. |
| 2014/0139541 A1 | 5/2014 | Willaert et al. |
| 2016/0094775 A1 | 3/2016 | Usami |

FOREIGN PATENT DOCUMENTS

| | | |
|---|---|---|
| DE | 102015218729 A1 | 3/2016 |
| EP | 1617265 A1 | 1/2006 |
| WO | WO 2018/173096 A1 | 9/2018 |

MICROSCOPE SYSTEM WITH AN INPUT UNIT FOR SIMULTANEOUSLY ADJUSTING AT LEAST THREE ADJUSTMENT PARAMETERS BY MEANS OF AN INPUT POINTER THAT IS POSITIONABLE IN AN INPUT AREA

CROSS-REFERENCE TO PRIOR APPLICATIONS

This application is a U.S. National Phase application under 35 U.S.C. § 371 of International Application No. PCT/EP2019/084982, filed on Dec. 12, 2019, and claims benefit to German Patent Application No. DE 10 2018 132 337.9, filed on Dec. 14, 2018. The International Application was published in German on Jun. 18, 2020 as WO 2020/120710 under PCT Article 21(2).

FIELD

The present invention relates to a microscopy system comprising at least one microscope component with electrically adjustable component parameters and comprising an input unit for setting a respective value for at least three of the setting parameters by means of an input pointer that is positionable in an input area, and to a method for setting a respective value for the at least three setting parameters by means of such an input unit.

BACKGROUND

Operating units which comprise a multiplicity of buttons, directional pads, etc., can be used to operate microscopes. To control appliance functions of, e.g., a camera, for example resolution, brightness, contrast, white balance, digital image or video format (e.g., BMP, TIF, JPG, MPG, AVI etc.), image or video compression method, etc., the user is forced to set numerous parameters non-intuitively and without identification of mutual dependencies.

DE 10 2010 063 392 A1 has disclosed a microscope system comprising an image capture device set up for optical and digital capture of an object with an object image being generated, and comprising a sensor screen embodied to display the object image in a display region and to capture inputs in the display region, wherein the microscope system is set up to alter settings of motorized and/or electrically controllable microscope components of the microscope system on the basis of the inputs captured from the display region of the sensor screen.

SUMMARY

In an embodiment, the present invention provides a microscope system, comprising: at least one microscope component with electrically adjustable component parameters; a controller configured to generate electrical signals and transmit the electrical signals to the at least one microscope component to set the electrically adjustable component parameters; and a computer comprising at least one display unit, the computer being configured to generate an input unit comprising a graphical user interface on the at least one display unit, at least three setting parameters being adjustable by the graphical user interface, wherein the input unit has an input pointer that is positionable in an input area so as to set a respective value for the at least three setting parameters, wherein a coordinate axis is defined in the input area for each of the at least three setting parameters, with at least one coordinate axis not being perpendicular to another coordinate axis, wherein the values of the at least three setting parameters are determined by the coordinates of the position of the input pointer, and wherein at least one electrically adjustable component parameter is set based on the at least three setting parameters.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
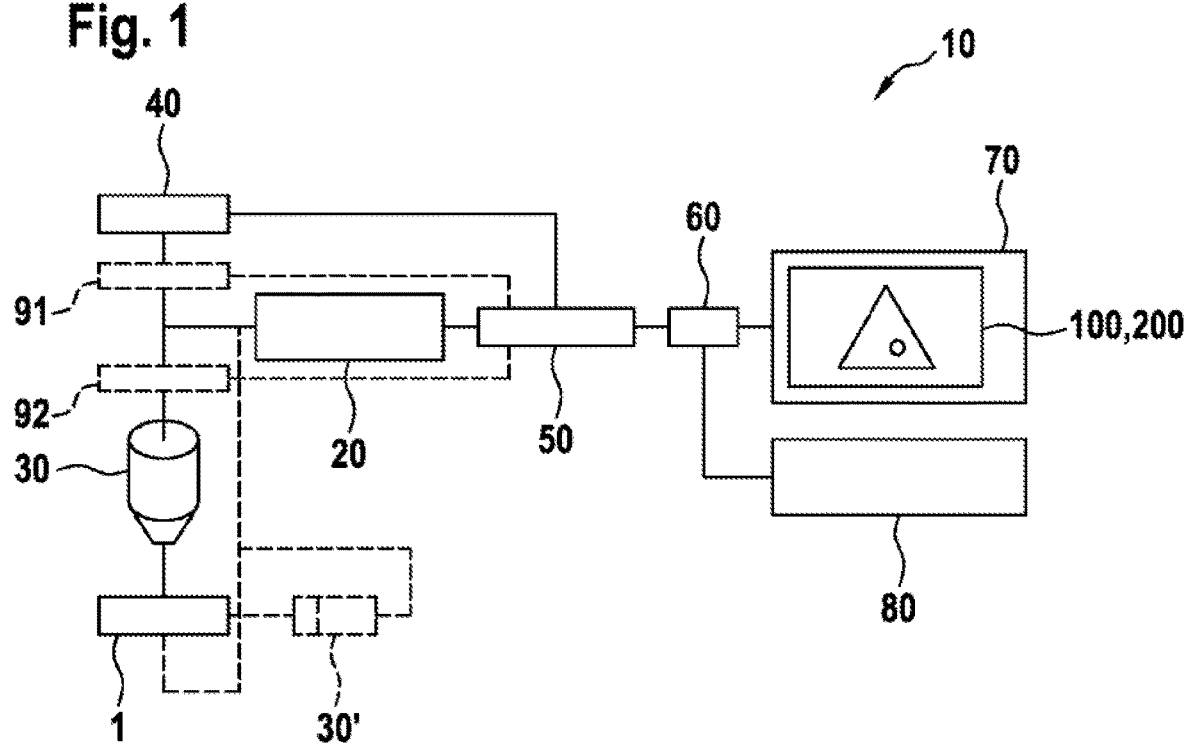
FIG. 1 shows a preferred embodiment of a microscope system according to the invention as a block diagram.

In an embodiment, the present invention provides a microscope system comprising at least one microscope component with electrically adjustable component parameters and a method for setting a respective value for at least three setting parameters by means of an input pointer that is positionable in an input area, as described herein.

The invention is based on the concept of it being possible to simultaneously set at least three setting parameters for the purposes of operating a microscope system by positioning an input pointer in an input area if the associated coordinate axes are defined accordingly and, in particular, are not perpendicular to one another. In this way, three or more coordinates can be obtained from a position in the two-dimensional area, even though these are not all independent of one another. To set a respective value for the setting parameters, the position of the input pointer in the input area is specified by a user.

In this case, the invention relates to a microscope system comprising at least one microscope component, in particular a light source (e.g., LED, laser) from which an illumination beam path emanates, an optical imaging device (e.g., objective or optical zoom), a contrasting apparatus (e.g., a phase ring in the case of phase contrast microscopy, DIC prisms, pole filters or modulating disks), a pinhole, a beam deflection device (e.g., scanning mirror), a light detector (e.g., photomultiplier or digital camera) or a display unit (e.g., computing unit/PC with monitor), each with at least one electrically adjustable component parameter.

The component parameters of the light source include, in particular, illumination intensity, wavelength, frequency (in time and/or space) of an illumination pattern, diameter of an illumination beam, and thickness of a light plane.

The component parameters of the optical imaging device include, in particular, a magnification factor and an illumination aperture.

The component parameters of the contrasting apparatus include, in particular, f-number and pivoting or adjustment parameters of (in particular contrast-generating) optical components in the beam path, such as, e.g., DIC prisms, phase rings, modulating disks or filter cubes (=set of optical filters and mirrors, in particular for use in fluorescence microscopy).

The component parameters of the beam deflection device include, in particular, scanning speed (number of lines scanned per unit time), zoom (smaller rotational range of the galvanometer drives), azimuth of the TIRF illumination beam path.

The component parameters of the light detector include, in particular, gain, offset, bit depth or color depth, exposure time (camera), scanning rate (light detector), sampling rate (frequency of a recording series (time-lapse) or of the live image), binning (combining adjacent picture elements (pixels) to form a virtual image point).

The component parameters of the pinhole include, in particular, the size of the aperture of the stop.

The component parameters of the display unit include, in particular, parameters of the representation, such as, e.g., brightness and contrast, and/or parameters of the image processing, such as, e.g., number of images to be combined by calculation to form an HDR recording ("high dynamic range image") and number of images over which a mean value is formed.

In particular, the invention can also be used advantageously in situations in which more than two parameters are adjustable but these are in fact related by dependencies or dependencies should exist therebetween, which dependencies can be implemented by the specification of suitable coordinate axes.

Such parameters where a mutual dependence is desirable include, for example, exposure time and illumination intensity when recording an image of tissue. To avoid tissue damage, the energy introduced (i.e., intensity times time) should not exceed a threshold where possible. For such a case, the coordinate axes can be placed in such a way that an increase in the intensity automatically leads to reduction of the exposure time, and vice versa. A further setting parameter in this case can also be, e.g., the wavelength (color) of the illumination, which likewise has an effect on the damage. It is well known that light with a short wavelength (blue) is more damaging than light with a long wavelength (red). Then, for example, an input unit according to the invention can be used to only allow harmless combinations of color, intensity, and time to be selectable.

Each component parameter depends on at least one setting parameter. In particular, each component parameter can simultaneously be a setting parameter in this case, i.e., the position of the input pointer directly sets a component parameter. However, provision can also be made for one or more component parameters to only emerge indirectly from one or more setting parameters, e.g., on the basis of functional relationships, characteristic lines, characteristic maps, lookup tables, etc. By way of example, a "bright" setting parameter can increase the illumination intensity and/or the detector gain and/or lengthen the exposure time. A "sample sparing" setting parameter can reduce the illumination intensity and/or shorten the exposure time and simultaneously increase the detector gain.

Preferably, the input area forms a polygon, wherein, further particularly, the number of corners or edges has an integer relationship with the coordinate axes. In this way, the coordinate axes can be defined particularly easily in relation to the edges of the polygon. By way of example, the coordinate axes can extend parallel or perpendicular to edges of the input area. In the latter case, the center of the input area expediently defines the coordinate origin.

Figure 2:
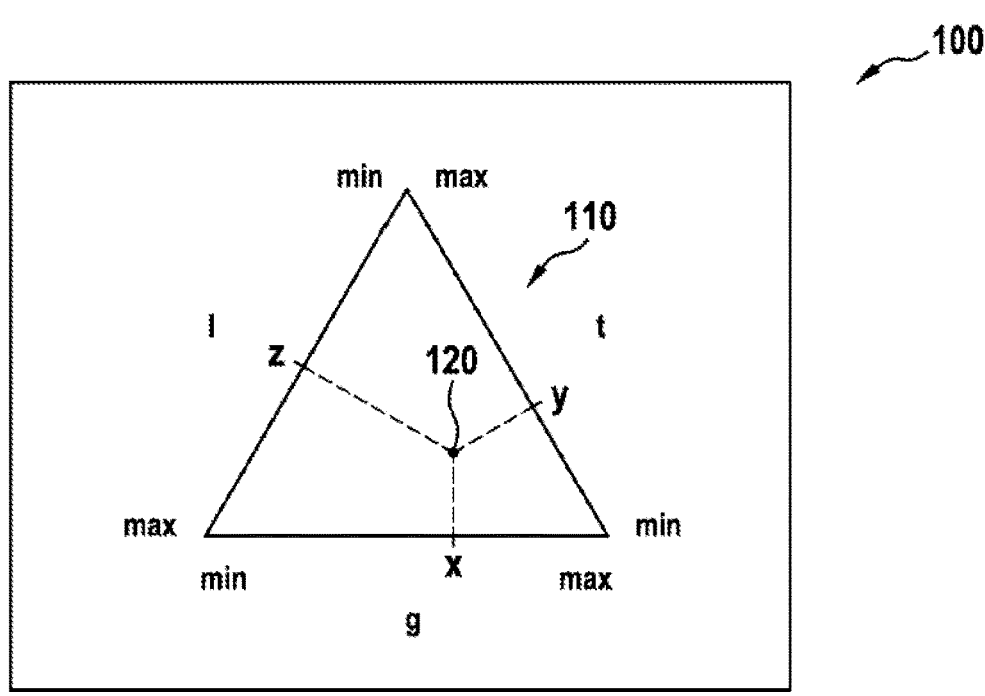
FIG. 2 schematically shows a preferred embodiment of an input unit according to the invention.
Figure 3:
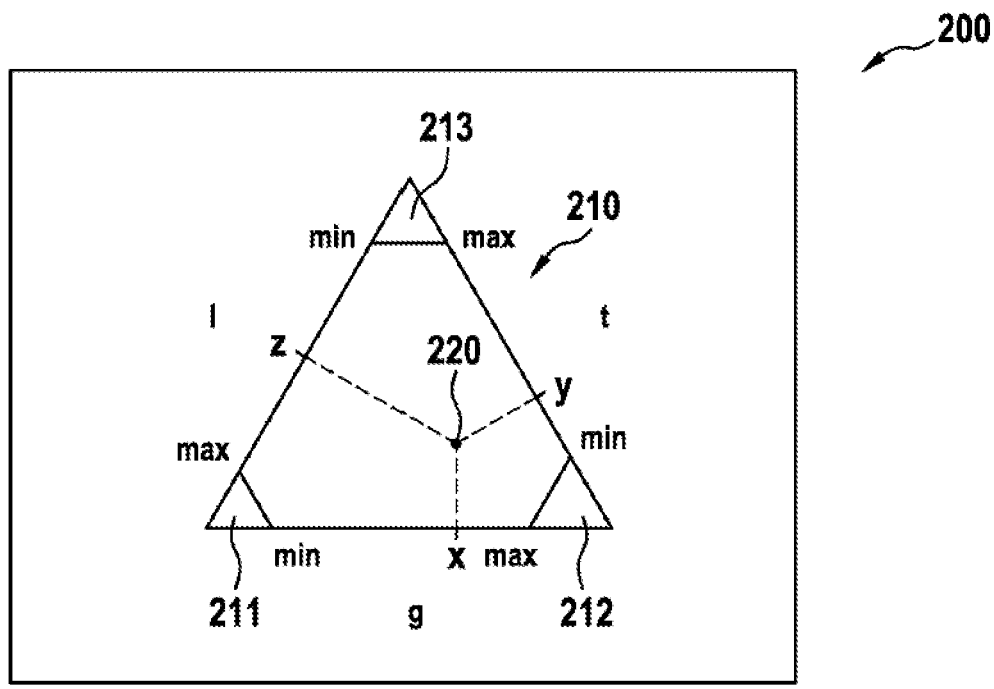
FIG. 3 schematically shows a further preferred embodiment of an input unit according to the invention.

Preferably, the profile of the coordinate axes is predetermined. This corresponds to a conventional use of coordinate axes and, in particular, comprises the case where the coordinate axes are formed by the edges of the input area or the case where the coordinate axes emanate from the coordinate origin, which is formed by the center of the input area, in a manner parallel or perpendicular to the edges. Such an embodiment is shown in FIGS. 2 and 3, in particular.

Figure 4A:
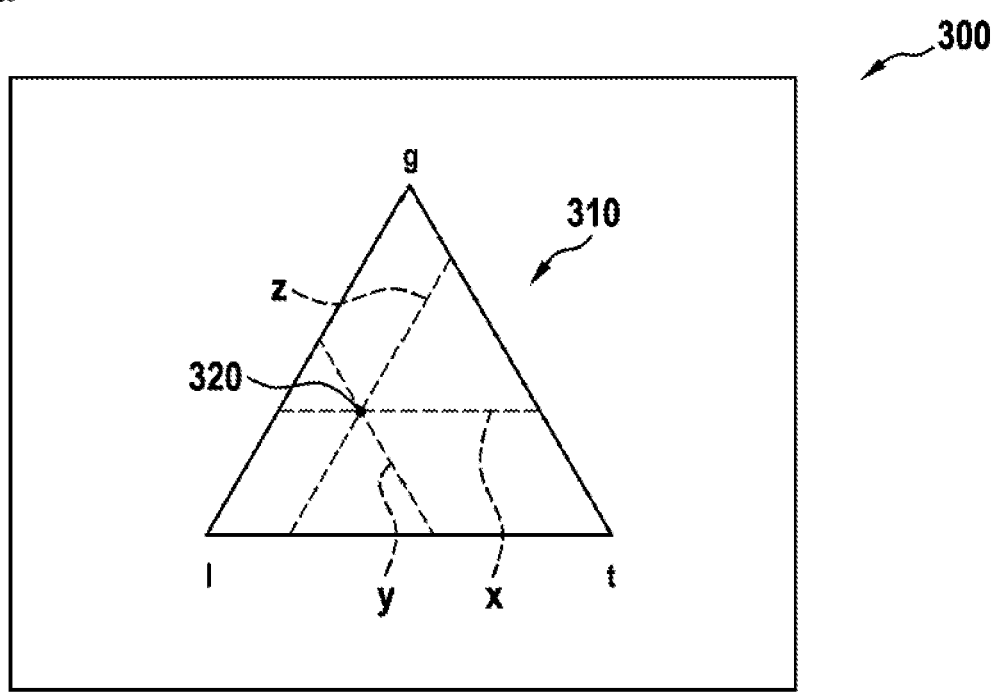
FIGS. 4*a* and 4*b* schematically show a further preferred embodiment of an input unit according to the invention.
Figure 4B:
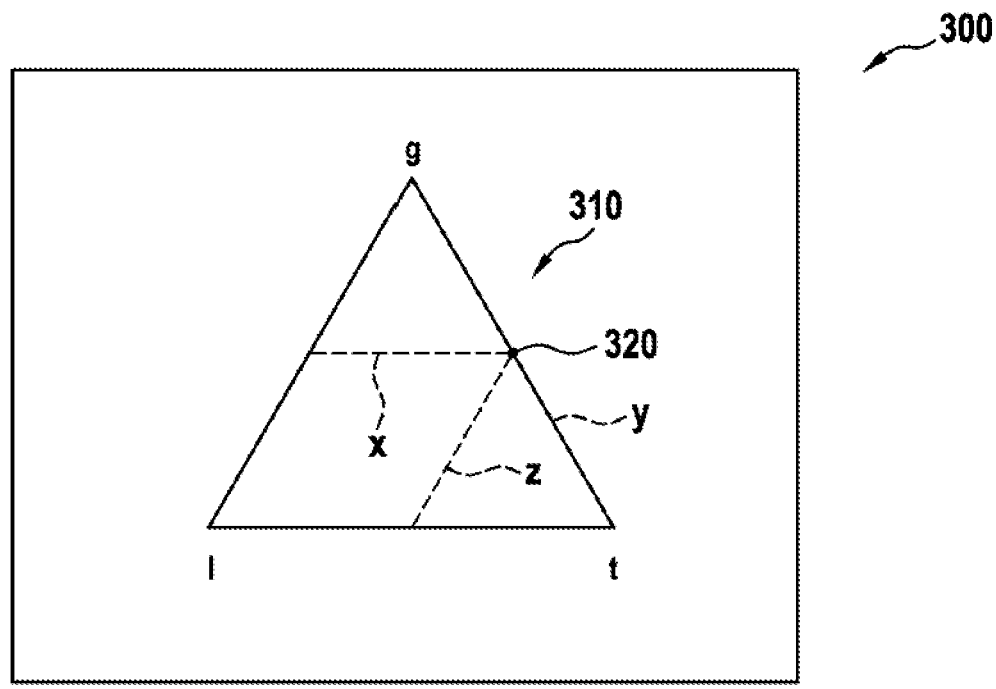
Figure 5:
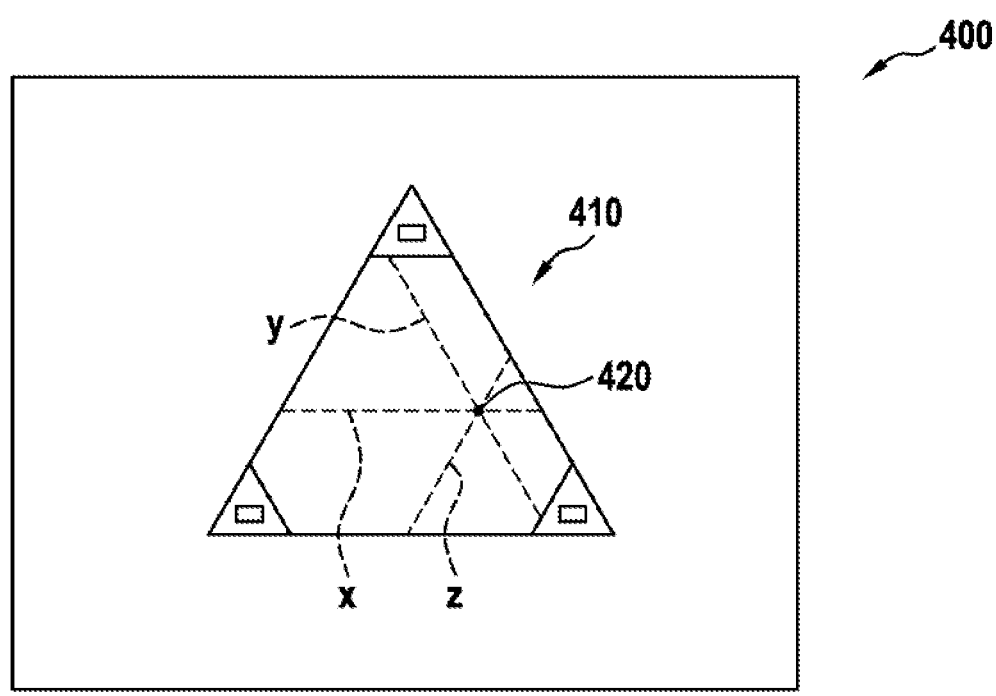
FIG. 5 schematically shows a further preferred embodiment of an input unit according to the invention.

In a further embodiment, the profile of the coordinate axes is variable and, in particular, specified by the respective current position of the input pointer, through which the coordinate axes extend. This corresponds to a particular use of coordinate axes and, in particular, comprises the case where the position of the input pointer on a coordinate axis determines the values of two component parameters relative to one another. Such embodiments are shown in FIGS. 4 and 5, in particular.

In the case where exactly three parameters can be set, the embodiment of the input area as a triangle or hexagon is advantageous, with the coordinate axes, in pairwise fashion, then including an angle of 60°, in particular. This leads to a solution that is operable in particularly intuitive fashion and optically appealing.

Further advantages and configurations of the invention emerge from the description and the attached drawing.

It is understood that the features specified above and yet to be explained below can be used not only in the respective combination specified but also in other combinations or on their own without departing from the scope of the present invention.

The invention is schematically presented on the basis of an exemplary embodiment in the drawing and is described below with reference to the drawing.

In FIG. 1, a preferred embodiment of a microscope system according to the invention is illustrated as a block diagram and denoted by 10 overall. In this case, the microscope system 10 comprises a light source 20, e.g., an LED light source, an optical imaging device 30, and a light detector 40, e.g., a digital camera, as microscope components. The optical imaging device 30 can be embodied as an objective or as an optical zoom or can have at least one of these two components. Additionally, a contrasting apparatus and/or a beam deflection device can also be provided in the optical imaging device as further microscope components.

An illumination beam path emanates from the light source 20 and is guided through the optical imaging device to a sample 1 and, from there, to the detector 40 (reflected light illumination). In the case of so-called transmitted light illumination, the illumination beam path is guided to the sample 1 from the side facing away from the imaging device 30 (dashed line). If this additionally is a so-called single plane illumination microscope, an additional optical imaging device 30' is also provided between light source 20 and sample.

In the case of so-called confocal microscopy, a scanning mirror 92 is additionally situated between light source 20 and imaging device 30 and a so-called pinhole 91 is additionally situated between scanning mirror 92 and light detector 40. Without pinhole 91, such a structure can also be used as a single plane illumination microscope.

Each of the microscope components has at least one electrically adjustable component parameter. The microscope system 10 further comprises a controller 50 which generates electrical signals and transmits the latter to the microscope components 20, 30, 40 and hence sets the electrically adjustable component parameters.

As a human-machine interface, the microscope system 10 furthermore comprises a computer 60 with a display unit 70, wherein the computer generates an input unit 100, 200 in the form of a graphical user interface on the display unit 70, at least three electrically adjustable component parameters being adjustable by means of said interface. The computer 60 comprises computer input means 80, e.g., mouse and/or keyboard and/or touch sensor system and/or gesture sensor system (e.g., a sensor screen or touchscreen).

The computer 60 has a data-transmitting link to the controller 50 and causes the controller 50 to generate electrical signals corresponding to the set values of the component parameters and output the latter to the appropriate microscope components. The controller 50 can also be integrated in the computer 60, for example in the form of an interface card.

In FIG. 2, a preferred embodiment of an input unit is illustrated schematically and denoted by 100 overall. The input unit 100 comprises an input area 110 and an input pointer 120 freely positionable therein. In the example shown, the input area 110 forms a triangle, wherein coordinate axes x, y, z extend parallel to the edges or are formed by the edges. In particular, the profile of the coordinate axes is predetermined in this case. Consequently, the three coordinates x, y, z are determined by the position of the input pointer 120 in the input area 110, as shown. In this case, coordinates can be obtained by perpendicular projection of the position on the respective coordinate axis. Consequently, following the positioning of the input pointer in the input area, the setting values for the associated setting parameters are set simultaneously, in particular in absolute fashion, by way of the relative position of said input pointer with respect to the coordinate axes.

In this sense, the edges of the input area 110 each define the adjustment range for the associated setting parameter. According to an alternative embodiment, the coordinate axes can extend perpendicular to the edges of the input area 110 and can be formed, for example, by the respective perpendicular bisector, which then defines the adjustment range for the respective setting parameter. In particular, the center of the input area also defines the coordinate origin in that case.

By way of example, such an input unit can be used to specify values for three setting parameters, wherein the values should not be completely independent of one another.

By way of example, the gain of the light detector, intensity of illumination, and exposure time are relevant as component parameters for the exposure of an image. By way of example, the gain g can be specified on the x-axis falling from left (min) to right (max), the exposure time t can be specified on the y-axis increasing from bottom right (short, min) to top center (long, max), and the intensity I can be specified on the z-axis increasing from bottom left (high, max) to top center (low, min). In this way, an increase in the intensity automatically leads to a reduction in the exposure time, and vice versa. Furthermore, a reduction in the gain automatically leads to an increase in the exposure time, and vice versa. And finally, an increase in the gain leads to a reduction in the intensity, and vice versa. In this way, it is possible to provide a parameter input option which is particularly intuitive for the user and particularly suitable and safe for the application. In this case, in the embodiment shown, each setting parameter is, in particular, a component parameter at the same time.

The input unit 100 is formed as a graphical user interface (GUI) on the display unit 70, in particular a sensor screen (touchscreen), of the computer 60 for controlling the microscope system 10, on which the input area 110 (and possibly axis labels, etc.) is illustrated. Using conventional computer input means 80 to position the input pointer 120 directly (e.g., finger, stylus, etc. in the case of a touchscreen) or indirectly (e.g., mouse or joystick, etc.) lends itself in this case. Provision can be made for a confirmation still to be required in order to adopt the values set by the position of the input pointer, for example by pressing or clicking a confirmation field or the like. After adoption, the computer 60 causes the controller 50 to set the corresponding setting parameters to the values set.

In FIG. 3, a further embodiment of an input unit is illustrated schematically and denoted by 200. The input unit 200 also comprises an input area 210 and an input pointer 220 freely positionable therein. However, in contrast to the input unit 100, the input area 210 of the input unit 200 forms a hexagon. This is because in the case of the input unit 100 as per FIG. 2, positioning the input pointer in a corner of the triangle eliminates a variation option for the third coordinate. To rectify this problem, the corners of the triangle can be made inaccessible, i.e., the input area forms a hexagon. Accordingly, the coordinate axes x, y, and z can be shortened as illustrated.

According to a further preferred embodiment, the space freed up in the corners can now advantageously be used for other functions, for example for trigger areas as shown in FIG. 3. In particular, three trigger areas 211, 212, 213 are therefore arranged next to the input area 210. In this case, the input area 210 and the three trigger areas 211, 212, 213 now form a triangle together. By way of example, by positioning the input pointer 120 in one of the three trigger areas 211, 212, or 213 or by clicking (computer input means), it is possible to trigger a function linked to the respective trigger area. In particular, this is suitable for an approval or confirmation function for the position of the input pointer 120, as explained above.

Preferably, the input unit 200 is set up for the function to be assignable to one or more trigger areas by the user. In this way, an operator can place the function important to them, in particular, on the input unit.

In FIG. 4, a further embodiment of an input unit is illustrated schematically and denoted by 300 overall. The input unit 300 comprises an input area 310 and an input pointer 320 freely positionable therein. In the example shown, the input area 310 forms a triangle, with coordinate axes x, y, z extending through the respective current position of the input pointer 320, in this case parallel to the edges (by way of example, an extent perpendicular to the edges would likewise be possible). In particular, the profile of the coordinate axes is not predetermined but variable in this case.

This embodiment is particularly suitable for a relative specification of the setting values for the associated setting parameters with respect to one another.

In the present example a), the coordinate axis x, in particular, defines the weighting of intensity I and exposure time t, in the specific case I=20, t=80, for example, if the coordinate axis overall defines the weighting 100. Furthermore, the coordinate axis y defines the weighting of exposure time t and gain g, specifically t=80, g=20 in the present case. Furthermore, the coordinate axis z defines the weighting of gain g and intensity I, specifically g=50, I=50 in the present case.

Overall, relative setting values of I=70, t=160, g=70 arise therefrom as setting parameters in the case of three coordinate axes which sum to 300, in particular. Accordingly, the third setting value can also be calculated from the two other setting values at all times. Which specific setting values for the component parameters are linked therewith can be specified by the manufacturer or can be defined by the user within the scope of the respective application. This can relate to functional relationships, characteristic lines, characteristic maps, or lookup tables, which can also be stored in the control software.

Consequently, following the positioning of the input pointer in the input area, the setting values for the associated setting parameters are set simultaneously, in particular relative to one another, by way of the relative position of said input pointer on the coordinate axes. This embodiment is advantageous in that the setting range is not restricted by approaching the corners of the input area but that the full setting range 0-100 is always available for the setting parameters (except for at the corner itself).

In the present example b), the weighting of intensity I and exposure time t as I=0, t=100 emerges from the coordinate axis x, the weighting of exposure time t and gain g as t=50, g=50 emerges from the coordinate axis y, and the weighting of gain g and intensity I, specifically as g=100, I=0, emerges from the coordinate axis z, and overall the setting parameters I=0, t=150, g=150 arise.

In FIG. 5, a further embodiment of an input unit is illustrated schematically and denoted by 400. The input unit 400 comprises an input area 410 and an input pointer 420 that is freely positionable therein, with, however, the corners of the triangle having been made inaccessible, like already in FIG. 3.

According to a further preferred embodiment, the space freed up in the corners can now advantageously be used for other functions, for example labeling of the coordinate axes as shown in FIG. 5. Consequently, the labeling can specify or relate to the setting parameters, in particular.

The setting parameters need not necessarily be technical parameters; rather, these can also be qualitative parameters (e.g., terms easier to convey to the user) such as "sample-sparing imaging", "fast imaging", or "high-quality imaging". In this case, the user in particular need not know what technical implementation is behind faster or better imaging. In particular, faster can mean that the exposure time/scanner speed is altered, but also that more light or an altered gain of the detector is required for further work in order to keep the exposure constant. Conversely, the image quality can be improved by virtue of the gain being reduced or averaging being carried out of a plurality of recordings. The values of the component parameters relevant for the respective setting then arise from the setting parameter values, for example on the basis of functional relationships, characteristic lines, characteristic maps, lookup tables, etc., it also being possible to take account of boundary conditions. By way of example, a boundary condition can be that the image must be exposed correctly and/or that the sample must not be damaged.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A microscope system, comprising:
at least one microscope component with electrically adjustable component parameters;
a controller configured to generate electrical signals and transmit the electrical signals to the at least one microscope component to set the electrically adjustable component parameters; and
a computer comprising at least one display unit, the computer being configured to generate a graphical user interface on the at least one display unit, at least three setting parameters being adjustable by the graphical user interface,
wherein the graphical user interface has an input pointer that is positionable in an input area so as to set a respective value for the at least three setting parameters,
wherein a coordinate axis is defined in the input area for each of the at least three setting parameters, with at least one coordinate axis not being perpendicular to another coordinate axis,
wherein the values of the at least three setting parameters are determined by the coordinates of the position of the input pointer, and
wherein at least one electrically adjustable component parameter is set based on the at least three setting parameters.

2. The microscope system of claim 1, wherein no coordinate axis is perpendicular to another coordinate axis.

3. The microscope system of claim 1, wherein the input area forms a polygon comprising a triangle or hexagon.

4. The microscope system of claim 3, wherein the coordinate axes extend parallel or perpendicular to edges of the input area.

5. The microscope system of claim 1, wherein the input unit graphical user interface is configured to set a respective value for exactly three setting parameters.

6. The microscope system of claim 5, wherein the coordinate axes, in pairwise fashion, include an angle of 60°.

7. The microscope system of claim 1, wherein a profile of the coordinate axes is predetermined.

8. The microscope system of claim 1, wherein the coordinate axes extend through the position of the input pointer.

9. The microscope system of claim 1, wherein the values of the at least three setting parameters are determined absolutely by the coordinates of the position of the input pointer.

10. The microscope system of claim 1, wherein the values of the at least three setting parameters are determined relative to one another by the coordinates of the position of the input pointer.

11. The microscope system of claim 1, wherein at least one setting parameter is an electrically adjustable component parameter.

12. The microscope system of claim 1, wherein at least one electrically adjustable component parameter arises from at least one setting parameter.

13. The microscope system of claim 1, wherein the graphical user interface comprises at least one trigger area, and
wherein a control command is triggerable by actuating the trigger area.

14. The microscope system of claim 13, wherein the control command is predetermined or configurable by a user.

15. The microscope system of claim 13, wherein the input area and the at least one trigger area adjoin one another.

16. The microscope system of claim 13, wherein the input area and the at least one trigger area together form a polygon comprising a triangle.

17. The microscope system of claim 1, wherein the at least one microscope component with at least one electrically adjustable component parameter is selected from a group, comprising:
a light source from which an illumination beam path emanates,
an optical imaging device,
a contrasting apparatus,
a pinhole,
a beam deflection device,
a light detector, and
a display unit.

18. The microscope system of claim 1, wherein at least one of the three component parameters is selected from a group comprising:
illumination intensity, wavelength, or temporal frequency of an illumination pattern;
spatial frequency of an illumination pattern;
diameter of an illumination beam;
thickness of a light plane, magnification factor, illumination aperture, f-number, pivoting or adjustment parameters of optical components in a beam path;
brightness, contrast, zoom, scanning speed, azimuth, gain, offset, bit depth, exposure time, sampling rate, binning, aperture of a pinhole, number of images to be combined by calculation to form an HDR recording, and number of images over which a mean value is formed.

19. The microscope system of claim 1, wherein the controller is integrated in the computer.

20. A method for setting a respective value for at least three setting parameters of the microscope system of claim 1, comprising:
specifying the position of the input pointer in the input area.

* * * * *